United States Patent [19]

Widhopf

[11] Patent Number: 5,522,305
[45] Date of Patent: Jun. 4, 1996

[54] WORT KETTLE FOR BOILING WORT FOR BREWING

[75] Inventor: Martin Widhopf, Freising-Pulling, Germany

[73] Assignee: Anton Steinecker Maschinenfabrik GmbH, Freising/Attaching, Germany

[21] Appl. No.: 390,860

[22] Filed: Feb. 16, 1995

[30] Foreign Application Priority Data

Feb. 16, 1994 [DE] Germany .......................... 94 02 547 U

[51] Int. Cl.⁶ .................................................. C12C 7/00
[52] U.S. Cl. .................................................. 99/276; 426/29
[58] Field of Search .......................... 99/276, 277, 277.1, 99/277.2, 278; 926/600, 29, 16; 935/93

[56] References Cited

U.S. PATENT DOCUMENTS

| | | | |
|---|---|---|---|
| 4,483,881 | 11/1984 | Lenz | 99/276 |
| 4,542,683 | 9/1985 | Wilkinson | 435/85 |
| 4,552,060 | 11/1985 | Redl | 426/29 |
| 4,793,243 | 12/1988 | Lenz | 99/277 |
| 4,813,346 | 3/1989 | Widhopf | 99/276 |

*Primary Examiner*—Robert W. Jenkins
*Attorney, Agent, or Firm*—Seed and Berry

[57] ABSTRACT

The present invention relates to a wort kettle for boiling wort for brewing, the wort kettle comprising a vapor escape pipe and a vapor compressor, wherein vapor can escape to the outside via the vapor escape pipe during heating of the wort kettle and can be diverted by means of a shut-off device via the vapor compressor during boiling. In accordance with the invention, the shut-off device is formed by a water tank which is arranged in the direction of flow of the vapor in the vapor escape pipe behind the branch towards the vapor compressor.

15 Claims, 2 Drawing Sheets

WORT KETTLE FOR BOILING WORT FOR BREWING

TECHNICAL FIELD

The present invention relates to a wort kettle for boiling wort for brewing, the kettle comprising a vapor escape pipe and a vapor compressor connected thereto, wherein vapor escapes to the outside via the vapor escape pipe during heating of the wort kettle and is diverted by means of a shut-off device via the vapor compressor during boiling.

BACKGROUND OF THE INVENTION

It is known in practice that wort kettles to which so-called vapor compressors can be connected are used when wort is being boiled for brewing processes. The vapor produced during boiling is introduced into the vapor compressor and the energy contained in the vapor is partly recovered. Vapor does here not escape to the outside. Vapor is introduced whenever the wort in the wort kettle has reached its boiling temperatures. Up to that time the vapor gradually forming during said process is passed to the outside through the vapor escape pipe. After the boiling temperature has been reached, a butterfly valve positioned thereon is closed so that the vapor is diverted towards the vapor compressor. When the vapor is being diverted via the vapor compressor, it must be ensured that neither excessive overpressure nor an excessive vacuum is created in the kettle in order to prevent damage to the kettle. It is therefore known that the pipe leading to the vapor compressor is operatively connected to a surge tank which has a pressure-regulating effect and, in case of excessive overpressure, diverts vapor via the vapor escape pipe and in case of an excessive vacuum sucks in air via the vapor escape pipe.

The disadvantage of said known construction must above all be seen in the fact that the shut-off devices designed as butterfly valves in the vapor escape pipes are relatively troublesome and expensive.

SUMMARY OF THE INVENTION

It is therefore the object of the present invention to provide a wort kettle which can be realized with little effort and has, nevertheless, the same effect.

This object is attained in that the shut-off device is formed by a surge tank which is arranged in the flow direction of the vapor in the vapor escape pipe behind the branch leading to the vapor compressor.

In case of such a solution the shut-off device is formed by a surge tank which can be realized much more easily than the control valve needed in the prior art. Moreover, the surge tank can simultaneously take over the function of an overpressure and vacuum safety means, so that the surge tank alone can fulfill the tasks accomplished in the prior art by a separate shut-off device and a surge tank.

The costs for separate shut-off devices are thereby saved, so that the manufacturing costs are small.

In a very advantageous embodiment the water seal in the surge tank is formed by condensed vapor. This solution is a very simple development of the invention, since a shut-off operation is automatically performed with denser vapor and increasing vapor amounts automatically by condensation of a corresponding vapor amount for forming the water seal in the surge tank at the time at which the boiling process proper starts and at which the shut-off devices would have to be closed in the prior art.

In another advantageous development of the invention, the surge tank is formed by an inner pipe member extending through the cover of the wort kettle, a siphon bell gripping over the upper end of the pipe member and by a vapor escape pipe section. With such a solution a kind of siphon-like diversion of the vapor is effected via the wort kettle in the area of the cover of the wort kettle in a simple manner, with an overpressure or vacuum protection taking place automatically in case of a water seal in the surge tank formed thereby.

In another advantageous development of the invention, an overflow pipe whose upper edge is positioned above the lower edge of the siphon bell terminates in the area of the water seal. The height difference between the opening of the overflow pipe and the lower edge of the siphon bell and the volume present in this area for the water seal then determine the response characteristics in case of overpressure.

In another advantageous development of the invention, an inspection glass is arranged in the area of the opening of the overflow pipe for monitoring the water seal in the surge tank. The inspection glass permits an inspection in the area of the water seal in a simple manner, so that it can be checked easily whether the function as an overpressure and vacuum safety means is ensured.

In another advantageous development, the vapor compressor is connected via a pipe extending through the side wall of the wort kettle to the pipe member within the wort kettle. In this embodiment the vapor pipe leading to the vapor compressor extends, in contrast to the prior art, within the wort kettle, so that the brewhouse operating chamber through which in the prior art the vapor pipes normally extend towards the vapor compressor remains free.

It is also possible to arrange a water spray nozzle within the siphon bell. The water spray nozzle can be used for cleaning purposes and also for forming the water seal when the water seal is not to be formed through the vapor alone.

Finally, the surge tank is advantageously arranged concentrically relative to the axis of the wort kettle.

The invention can equally be used for wort kettles with internal or external boiling apparatus and also for whirlpool kettles or combined wort and whirlpool kettles or lauter tuns under inert gas pressure.

BRIEF DESCRIPTION OF THE DRAWINGS

The invention shall now be explained and described further with reference to an embodiment illustrated in the drawing.

DETAILED DESCRIPTION OF THE INVENTION

Figure 1:
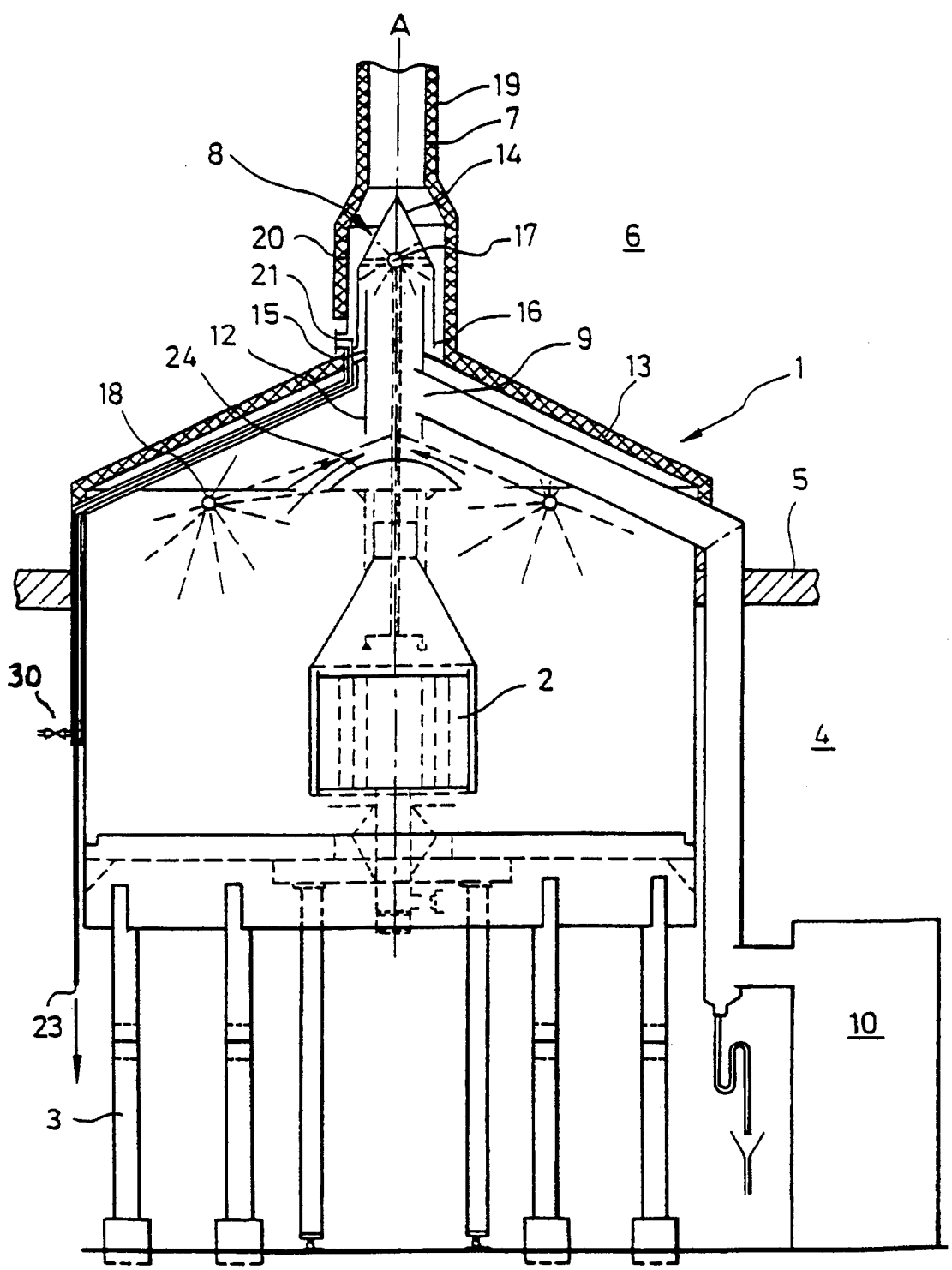
FIG. 1 is a cross-sectional view of a wort kettle in accordance with the present invention.

The drawing shows a wort kettle in the form of a whirlpool kettle, which is designated by 1 on the whole. The kettle is supported in a lower chamber 4 on feet 3 and projects with its upper part through a partition 5 in a brewhouse into a brewhouse operating chamber 6. In the illustrated embodiment the kettle comprises an internal boiling apparatus 2 for heating the wort introduced into the kettle.

During heating the wort is directed towards a deflector 24 and then flows downwards into the kettle, as is generally known.

Wort kettles of this type are generally formed as round receptacles concentrically arranged relative to an axis A and are closed upwardly by a cover 13.

A surge tank 8 is arranged according to the invention concentrically to axis A in the tip of cover 13. The surge tank is formed by the vapor escape pipe section 20 as the outer wall, the upper part of pipe member 12 and siphon bell 14 which is positioned with its lower edge 16 between the vapor escape pipe section 20 and the upper part of pipe member 12. The siphon bell is also concentrically formed relative to axis A in a surrounding manner with a circular cross-section, just like pipe member 12 and vapor escape pipe section 20. To form the vapor escape pipe section 20, the vapor escape pipe 7 is formed in the area of surge tank 8 with an enlarged cross section. An inspection glass 21 which is about at the level of the lower edge 16 of the siphon bell 14 is arranged in the area of a water seal (see also FIGS. 2*a*–2*c*). Furthermore, an overflow pipe 15 which also extends through the interior of the wort kettle along cover 13 and then through a side wall and opens into outlet 23 terminates in said area.

Spray nozzles 18 are positioned within kettle 4 for introducing water for known purposes. A water spray nozzle 17 is arranged in the area of surge tank 8 within siphon bell 14 above the upper edge of pipe member 12. The whole cover area and also pipe section 20 as well as the vapor escape pipe 7 are covered with an insulation 19.

Furthermore, the vapor pipe 11 branches off from pipe member 12 at branch 9 towards a vapor compressor 10 within kettle 1. The vapor pipe exits at the side wall shown at the right side in the drawing through the wort kettle and is then immediately guided through partition 5 (bottom) downwards towards vapor compressor 10. This means that the pipe does virtually not extend within the brewhouse operating chamber 6, resulting in the creation of a free space.

Figure 2C:
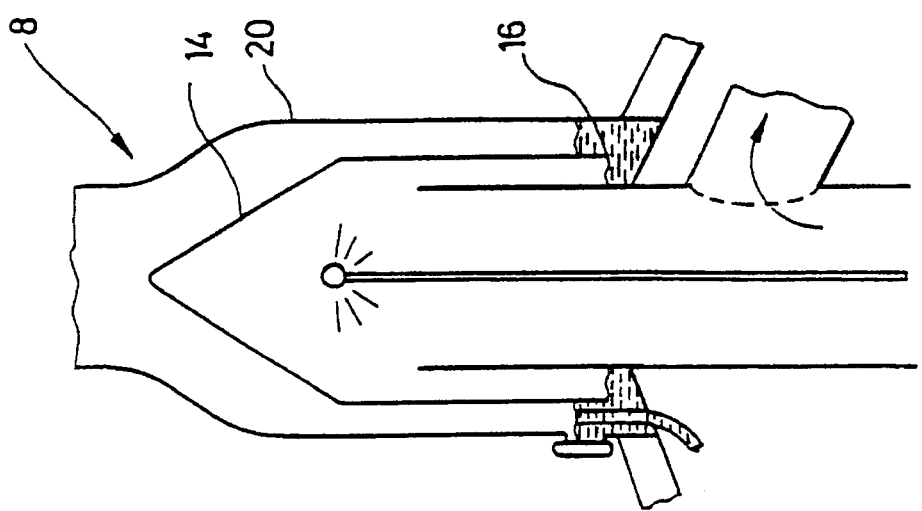
FIG. 2c is an enlarged cross-sectional view of a surge tank in the wort kettle of FIG. 1 with a water seal therein forming an overpressure and vacuum safety means.
Figure 2B:
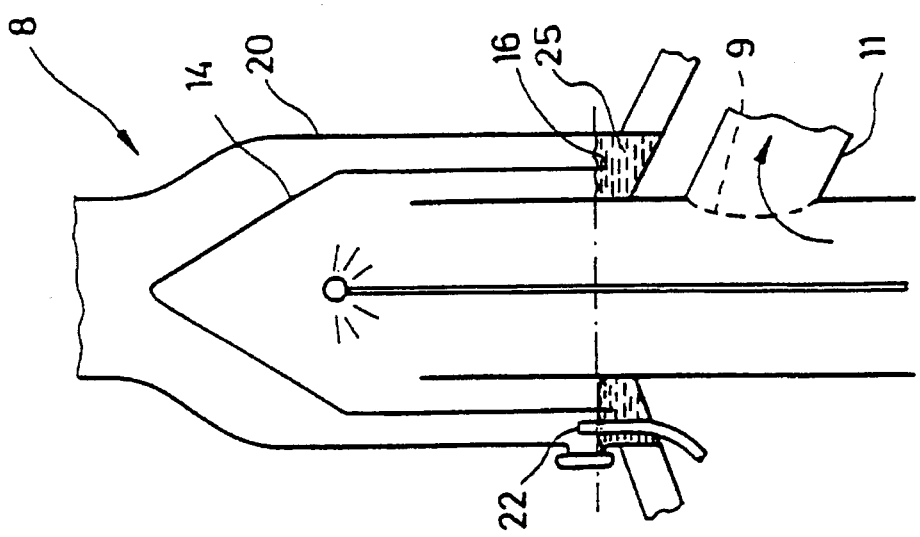
FIG. 2b is an enlarged cross-sectional view of a surge tank in the wort kettle of FIG. 1 with a water seal therein forming a gas seal.
Figure 2A:
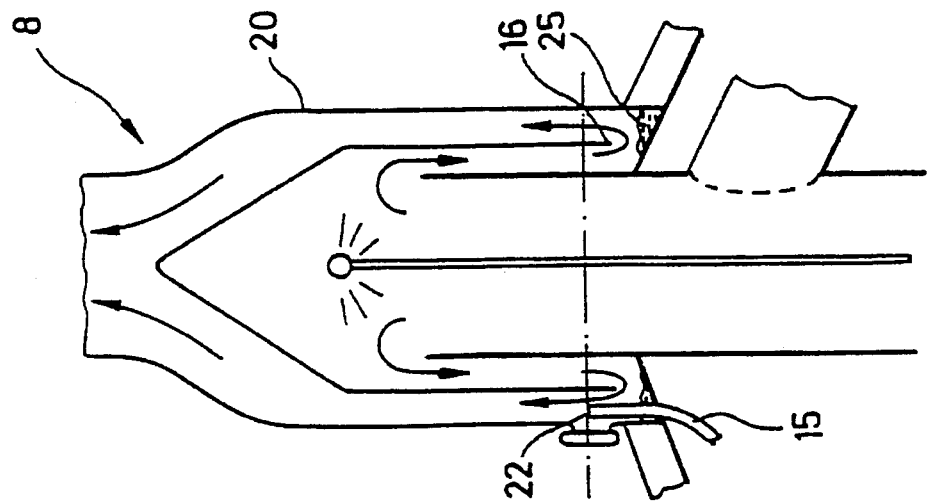
FIG. 2a is an enlarged cross-sectional view of a surge tank in the wort kettle of FIG. 1.

The mode of operation of the apparatus of the invention shall now be further explained with reference to FIGS. 2*a*–2*c*.

After wort has been introduced into the interior of wort kettle 1 through known feed pipes (not shown in more detail), brewing may be started. Wort is here heated via the internal boiling apparatus 2. Vapors which pass upwards through pipe member 12 around the upper edge of the pipe member downwards and below the lower edge 16 of siphon bell 14 again upwards into the vapor escape pipe 7 and can exit from there to the outside are already formed during the heating phase. With an increasing vapor formation an increasing liquid amount gradually condenses in the area of the siphon bell and collects on the bottom of the surge tank 8 formed by cover 13 so as to form a water seal 25. The level of the water seal 25 will rise gradually until the opening 22 of overflow pipe 15 is reached, as shown in FIG. 2*b*. In addition to water formed by vapor condensation and acting as water seal 25, a suitable amount of water may also be supplied via valve 30 which is connected to the outflow pipe 15 by feeding water.

As soon as the lower edge 16 of siphon bell 14 has been reached, the water seal 25 forms a gas seal, so that vapor steam is prevented from freely escaping through the vapor escape pipe 7. The shut-off effect thereby becomes operative. Vapor then passes automatically through branch 9, as shown by the arrow in FIG. 2*b*, into the vapor pipe 11 and flows towards the vapor compressor 10 where it is compressed in the known manner. Whenever pressure variations arise in the wort kettle, the water seal 25, as shown in FIG. 2*c* for the case of an overpressure, acts as an overpressure and vacuum safety means. In case of overpressure the water column is pushed down within the siphon bell, so that the excess water quantity can escape through the opening 22 of the overflow pipe. In case of a great overpressure water may be pressed out entirely, so that vapor can again escape freely through the vapor escape pipe 7. Suitable or desired pressure values may be set by suitably arranging the opening 22 relative to the lower edge of siphon bell 14. It may here be advantageous when the overflow pipe or the opening thereof is arranged in a vertically displaceable manner in the area of the water seal. On the other hand, if there is a vacuum in the kettle, the water seal will be sucked upwards by the resultant suction in the area between pipe member 12 and siphon bell 15. This sucking action has the effect that the level outside the siphon bell wall between the vapor escape pipe section 20 is lowered to such an extent that gas is sucked below the lower edge 16 through the ambient air via the vapor escape pipe 7 inwards into the kettle, with a resultant protection against vacuum. The water surge tank 8 of the invention thus fulfills both the function of a shut-off device between the vapor escape pipe and the vapor compressor and the function of a vacuum or overpressure safety means. After the boiling operation has been concluded, the water seal may also be discharged via the outflow pipe 23, for which purpose either the opening 21 of overflow pipe 15 is pushed downwards to a corresponding extent, or a tapering outflow pipe (not shown in more detail) is opened by the bottom surface of the surge tank.

Numerous modifications and variations of the wort kettle disclosed herein will occur to those skilled in the art in view of this disclosure. Such modifications and variations may be practiced while remaining within the spirit and the scope of the invention as defined in the following claims.

What is claimed is:

1. A wort kettle assembly for boiling wort for brewing and creating gaseous vapor and condensed vapor therein, comprising:

a kettle having a top portion;

a cover connected to said top portion of said kettle, said cover having an aperture therein;

a vapor escape pipe having a bottom end sealably connected to said cover to surround said aperture;

an inner pipe positioned within said vapor escape pipe and extending through said aperture, said inner pipe being sealably connected to said cover adjacent to said aperture, said inner pipe and said vapor escape pipe defining a condensed vapor trap therebetween to retain the condensed vapor therein; and an intermediate pipe between said inner pipe and said vapor escape pipe, said intermediate pipe having a top portion above said inner pipe and having an open bottom end located above said cover to define a vapor path between said inner pipe and said intermediate pipe and between said intermediate pipe and said vapor escape pipe, said open bottom end being positioned in said condensed vapor trap to extend into the condensed vapor when the condensed vapor is at a predetermined level such that said condensed vapor provides a barrier in said vapor path to block the gaseous vapor from moving through said vapor path past said condensed vapor trap.

2. The wort kettle assembly of claim 1 wherein said first aperture has a first diameter, and said vapor escape pipe has a second diameter that is greater that said first diameter.

3. The wort kettle assembly of claim 2 wherein said inner pipe, intermediate pipe, and vapor escape pipe are coaxially aligned.

4. The wort kettle assembly of claim 1 further comprising an overflow pipe having an open end in said condensed vapor trap, said open end being positioned above said open bottom end of said intermediate pipe to carry condensed vapor out of said condensed vapor trap when the condensed vapor reaches said predetermined level above said open bottom end.

5. The wort kettle assembly of claim 4 further comprising an inspection window attached to said vapor escape pipe and positioned adjacent to said open end of said overflow pipe.

6. The wort kettle assembly of claim 1 wherein said inner pipe has an upper portion above said cover and a lower portion under said cover, and said inner pipe has a branch portion attached to said lower portion, said wort kettle assembly further including a vapor compressor coupled to said branch portion or said inner pipe.

7. The wort kettle assembly of claim 6 wherein said vapor compressor is exterior of said kettle, and said kettle has a side wall, said branch portion of said inner pipe extends through said side wall and is attached to said vapor compressor.

8. The wort kettle assembly of claim 1, further comprising a water spay nozzle located in said intermediate pipe.

9. The wort kettle assembly of claim 1 wherein said kettle has a central axis and said inner pipe, intermediate pipe, and vapor escape pipe are concentrically disposed about said central axis.

10. A wort kettle assembly for boiling wort for brewing and creating gaseous vapor and condensed vapor therein, comprising:

a kettle having a central axis;

a cover connected to said kettle, said cover having an aperture therein coaxially aligned with said central axis, said aperture having a first diameter;

a vapor escape pipe coaxially aligned with said central axis and extending upwardly from said cover, said vapor escape pipe having a bottom end sealably connected to said cover around said aperture, said vapor escape pipe having a second diameter that is greater that said first diameter;

an inner pipe coaxially aligned with said central axis and extending through said aperture, said inner pipe being sealably connected to said cover radially inward of said bottom end of said vapor escape pipe, said inner pipe and said vapor escape pipe defining a condensed vapor trap above said cover to retain the condensed vapor therein; and an intermediate pipe coaxially aligned with said central axis and concentrically positioned between said inner pipe and said vapor escape pipe, said intermediate pipe having a top end above said inner pipe and an open bottom end located in said condensed vapor trap to define a vapor path between said inner pipe and said intermediate pipe and between said intermediate pipe and said vapor escape pipe, said open bottom end being positioned to extend into the condensed vapor when the condensed vapor is at a predetermined level such that said condensed vapor provides a barrier in said vapor path to block the gaseous vapor from moving through said vapor path and past said condensed vapor trap.

11. The wort kettle assembly of claim 10 further comprising an overflow pipe having an open end in said condensed vapor trap, said open end being positioned above said open bottom end of said intermediate pipe to carry condensed vapor out of said condensed vapor trap when the condensed vapor reaches said predetermined level above said open bottom end.

12. The wort kettle assembly of claim 11 further comprising an inspection window attached to said vapor escape pipe and positioned adjacent to said open end of said overflow pipe.

13. The wort kettle assembly of claim 10 wherein said inner pipe has an upper portion above said cover and a lower portion under said cover, and said inner pipe has a branch portion attached to said lower portion, said wort kettle assembly further including a vapor compressor coupled to said branch portion or said inner pipe.

14. The wort kettle assembly of claim 13 wherein said vapor compressor is exterior of said kettle, and said kettle has a side wall, said branch portion of said inner pipe extends through said side wall and is attached to said vapor compressor.

15. The wort kettle assembly of claim 10 further comprising a water spay nozzle located in said intermediate pipe.

* * * * *